US010257053B2

(12) United States Patent
Abrams et al.

(10) Patent No.: US 10,257,053 B2
(45) Date of Patent: Apr. 9, 2019

(54) ANALYZING CONTENTION DATA AND FOLLOWING RESOURCE BLOCKERS TO FIND ROOT CAUSES OF COMPUTER PROBLEMS

(71) Applicant: INTERNATIONAL BUSINESS MACHINES CORPORATION, Armonk, NY (US)

(72) Inventors: Robert M. Abrams, Poughkeepsie, NY (US); Karla K. Arndt, Rochester, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 82 days.

(21) Appl. No.: 15/194,836

(22) Filed: Jun. 28, 2016

(65) Prior Publication Data
US 2017/0373925 A1  Dec. 28, 2017

(51) Int. Cl.
*G06F 15/173* (2006.01)
*H04L 12/24* (2006.01)
*G06F 11/30* (2006.01)

(52) U.S. Cl.
CPC ......... *H04L 41/5035* (2013.01); *G06F 11/30* (2013.01); *H04L 41/065* (2013.01)

(58) Field of Classification Search
CPC ................. H04L 41/0631; H04L 43/065
See application file for complete search history.

(56) References Cited

U.S. PATENT DOCUMENTS

| 7,203,624 B2 | 4/2007 | Warshawsky |
| 7,516,362 B2 | 4/2009 | Connelly et al. |
| 7,552,447 B2 | 6/2009 | Uthe |

(Continued)

FOREIGN PATENT DOCUMENTS

EP  2566103 A2  3/2013

OTHER PUBLICATIONS

EMC2, Automated Root-Cause and Impact Analysis for Availability Across the Fibre Channel SAN, Data Sheet, 2012, pp. 1-5.
(Continued)

*Primary Examiner* — Hua Fan
(74) *Attorney, Agent, or Firm* — Cantor Colburn LLP; William Kinnaman

(57) ABSTRACT

Present disclosure relates to methods, processing systems and computer program products of analyzing contention data and following resource blockers to find root causes of computer problems. The method may include: detecting one or more resource waiters in a computer system, iteratively determining whether the resource blockers are a resource waiter, until a final resource blocker not waiting for another resource is found, determining, whether final resource blocker is caused by a resource blocker in a different computer system, iteratively executing, the method on the different computer system to find the final resource blocker not waiting for another resource is found, determining, whether the final resource blocker has more than one symptom that may or may not be a contention problem, selecting a symptom that has the highest priority as the root cause of the computer problems, and generating, using the processor, a report of root causes of the computer problems.

17 Claims, 4 Drawing Sheets

(56) References Cited

U.S. PATENT DOCUMENTS

| | | |
|---|---|---|
| 7,818,418 B2 | 10/2010 | Bansal et al. |
| 8,032,621 B1 | 10/2011 | Upalekar et al. |
| 8,264,702 B2 | 9/2012 | St. Jacques, Jr. et al. |
| 9,015,194 B2 | 4/2015 | Ziv et al. |
| 9,772,898 B2 | 9/2017 | Deshpande et al. |
| 2004/0128385 A1 | 7/2004 | Arwe |
| 2004/0139142 A1 | 7/2004 | Arwe |
| 2006/0242288 A1* | 10/2006 | Masurkar ............ G06F 11/0709 709/223 |
| 2017/0054610 A1 | 2/2017 | Vangala |

OTHER PUBLICATIONS

Paulo et al., "Root-cause Analysis of Performance Anomalies in Web-based Applications", ACM, Mar. 21, 2011, pp. 209-216.

Shrouti et al., "Root Cause Analysis of Product Service Failure Using Computer Experimentation Technique," Procedia CIRP 11, 2013, 44-49.

SigmaGuardian, "Intro-Presentation Executive Briefing," Warwick Analytics, pp. 1-12.

Tech Corp Legal LLP, "Automated Root Cause Analysis," US Patent Office, Aug. 11, 2015, pp. 1-23.

\* cited by examiner

ANALYZING CONTENTION DATA AND FOLLOWING RESOURCE BLOCKERS TO FIND ROOT CAUSES OF COMPUTER PROBLEMS

BACKGROUND

The present disclosure relates to computer systems, and more specifically, to computer systems, methods and computer program products for analyzing contention data and following resource blockers to find root causes of computer problems.

It is well-known that computer systems have problems and that these problems can be very complex, especially in distributed systems where relationships between applications including operating system, middleware, and end-user applications cannot possibly be mapped and are always changing. Therefore, finding the root causes of computer problems is extremely difficult. Current solutions to the computer problems include: requiring prior knowledge of the computer system or infrastructure of the computer system, modeling normal behaviors even while applications are running, comparing current state of the computer system with the normal behavior modeled, and potentially discovering the root cause. In certain situations, having prior knowledge of the computer system or infrastructure of the computer system, and/or modeling normal behavior may not be possible, especially for a collaborative distributed computer system.

Therefore, heretofore unaddressed needs still exist in the art to address the aforementioned deficiencies and inadequacies.

SUMMARY

In one aspect, the present disclosure relates to a method of analyzing contention data and following resource blockers to find root causes of computer problems. In certain embodiments, the method may include: detecting one or more resource waiters in a computer system, each of the resource waiters is associated with a corresponding one of one or more processes, iteratively determining whether one of the resource blockers is a resource waiter, until a final resource blocker not waiting for another resource is found, responsive to finding the final resource blocker: determining whether the final resource blocker is caused by a resource blocker in one of computer systems of a collaborative distributed computer system, and defining the final contention event as the final event when the final resource blocker is not caused by a resource blocker in one of computer systems of the collaborative distributed computer system, iteratively executing the method on the different computer system that caused the final resource blocker found in the computer system previously when the final resource blocker is caused by the resource blocker in one of computer systems of the collaborative distributed computer system, until a final resource blocker not waiting for another resource in the collaborative distributed computer system is found, determining, whether the final resource blocker has more than one symptoms, responsive to determining that the final resource blocker has one or more symptoms, each having a priority associated with the symptom, selecting a symptom that has the highest priority as a primary root cause of the computer problems and generating, using the processor, a report of root causes of the computer problems.

In another aspect, the present disclosure relates to a processing system for analyzing contention data and following resource blockers to find root causes of computer problems. In certain embodiments, the processing system may include a processor, a communication network configured to communicate with one or more processes running on the processing system, and connect one or more computer systems, a graphical user interface configured to display a process of finding root causes of the computer problems, and one or more intermediate results, and a memory storing an operating system and a root cause analysis module having computer executable instructions. When executed at the processor of the processing system, the computer executable instructions may cause the processor to perform: detecting one or more resource waiters in a computer system, each of the resource waiters is associated with a corresponding one of one or more processes, iteratively determining whether one of the resource blockers is a resource waiter, until a final resource blocker not waiting for another resource is found, responsive to finding the final resource blocker: determining whether the final resource blocker is caused by a resource blocker in one of computer systems of a collaborative distributed computer system, and defining the final contention event as the final event when the final resource blocker is not caused by a resource blocker in one of computer systems of the collaborative distributed computer system, iteratively executing the method on the different computer system that caused the final resource blocker found in the computer system previously when the final resource blocker is caused by the resource blocker in one of computer systems of the collaborative distributed computer system, until a final resource blocker not waiting for another resource in the collaborative distributed computer system is found, determining, whether the final resource blocker has more than one symptoms, responsive to determining that the final resource blocker has one or more symptoms, each having a priority associated with the symptom, selecting a symptom that has the highest priority as a primary root cause of the computer problems and generating, using the processor, a report of root causes of the computer problems.

In yet another aspect, the present disclosure relates to a computer program product. In certain embodiments, the computer program product may include a non-transitory storage medium readable by a processor of a processing system and storing computer executable instructions for execution by the processor to perform a method of analyzing contention data and following resource blockers to find root causes of computer problems. The method may include: detecting one or more resource waiters in a computer system, each of the resource waiters is associated with a corresponding one of one or more processes, iteratively determining whether one of the resource blockers is a resource waiter, until a final resource blocker not waiting for another resource is found, responsive to finding the final resource blocker: determining whether the final resource blocker is caused by a resource blocker in one of computer systems of a collaborative distributed computer system, and defining the final contention event as the final event when the final resource blocker is not caused by a resource blocker in one of computer systems of the collaborative distributed computer system, iteratively executing the method on the different computer system that caused the final resource blocker found in the computer system previously when the final resource blocker is caused by the resource blocker in one of computer systems of the collaborative distributed computer system, until a final resource blocker not waiting for another resource in the collaborative distributed computer system is found, determining, whether the final resource blocker has more than one symptoms, responsive to determining that the final resource blocker has one or more symptoms, each having a priority associated with the symptom, selecting a symptom that has the highest priority as a primary root cause of the computer problems and generating, using the processor, a report of root causes of the computer problems.

These and other aspects of the present disclosure will become apparent from the following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
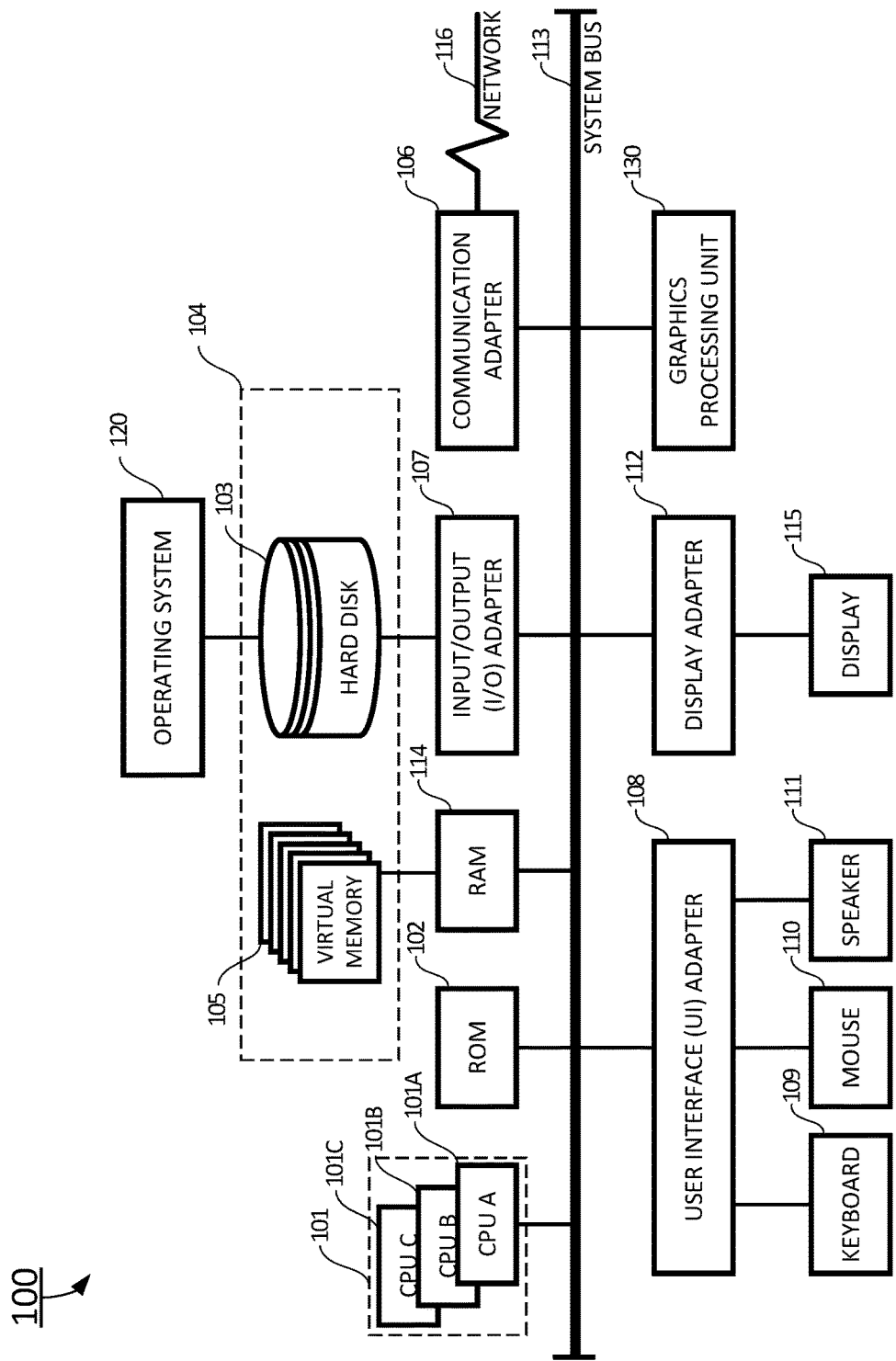
FIG. 1 is a block diagram illustrating an exemplary computer system for analyzing contention data and following resource blockers to find root causes of computer problems according to certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. It will be appreciated that same thing can be said in more than one way. Consequently, alternative language and synonyms may be used for any one or more of the terms discussed herein, nor is any special significance to be placed upon whether or not a term is elaborated or discussed herein. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "plurality" means two or more. The terms "comprising," "including," "carrying," "having," "containing," "involving," and the like are to be understood to be open-ended, i.e., to mean including but not limited to.

The term computer program, as used above, may include software, firmware, and/or microcode, and may refer to programs, routines, functions, classes, and/or objects. The term shared, as used above, means that some or all code from multiple modules may be executed using a single (shared) processor.

The term "process" may include a job, a batch job, a running computer program, a part of any running computer program, an address space, a task, and a thread.

The term "resource" in a computer system may include resources such as a variable, a database table, a database row, a database column, an internal structure in memory, a physical resource, and a subroutine in the code. The term "resource" in a collaborative distributed computer system may include anything that needs sharing, such as resources shared among the computer systems of the collaborative distributed computer system. Some of the examples of shared resource may include a variable, a database table, a database row, a database column, an internal structure in memory, a physical resource, and a subroutine in the code.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings FIGS. 1-4, in which certain exemplary embodiments of the present disclosure are shown. The present disclosure relates to a method of analyzing contention data and following resource blockers to find root causes of computer problems, and the method does not require any prior knowledge of the computer system, or the infrastructure of the computer system. It does not model the normal behaviors and does not know what the current state of the computer system is or what the current state of the computer system should be.

The present disclosure may, however, be embodied in many different forms and should not be construed as limited to the embodiments set forth herein; rather, these embodiments are provided so that this disclosure will be thorough and complete, and will fully convey the scope of the disclosure to those skilled in the art.

Referring to FIG. 1, an exemplary embodiment of a computer system 100 for analyzing contention data and following resource blockers to find root causes of computer problems and implementing the teachings is shown according to certain embodiments of the present disclosure. In this embodiment, the computer system 100 has one or more central processing units (processors) 101A, 101B, 101C, etc. (collectively or generically referred to as processor(s) 101). In one embodiment, each of the processors 101 may include a reduced instruction set computer (RISC) microprocessor. Processors 101 are coupled to a system memory 114 and various other components via a system bus 113. Read only memory (ROM) 102 is coupled to the system bus 113 and may include a basic input/output system (BIOS), which controls certain basic functions of the computer system 100.

FIG. 1 further depicts an input/output (I/O) adapter 107 and a communication adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and virtual memory device 105 are collectively referred to herein as mass storage 104. An operating system 120 for execution on the computer system 100 may be stored in mass storage 104. The communication adapter 106 interconnects bus 113 with an outside network 116 enabling the computer system 100 to communicate with other such systems. A screen (e.g., a display monitor) 115 is connected to system bus 113 by a display adaptor 112, which may include a graphics adapter to improve the performance of graphics intensive applications and a video controller. In one embodiment, the I/O adapters 107, the communication adapter 106, and the display adapter 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and the display adapter 112. A keyboard 109, a mouse 110, and one or more speakers 111 all interconnected to bus 113 via user interface adapter 108, which may include, for example, a Super I/O chip integrating multiple device adapters into a single integrated circuit.

In exemplary embodiments, the computer system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing, and has a highly parallel structure that makes it more effective than general-purpose CPUs for algorithms where processing of large blocks of data is done in parallel.

Thus, as configured in FIG. 1, the computer system 100 includes processing capability in the form of processors 101, storage capability including the system memory 114 and mass storage 104, input means such as the keyboard 109 and the mouse 110, and the output capability including the one or more speakers 111 and display 115. In one embodiment, a portion of the system memory 114 and mass storage 104 collectively store the operating system 120 to coordinate the functions of the various components shown in FIG. 1. In certain embodiments, the network 116 may include symmetric multiprocessing (SMP) bus, a Peripheral Component Interconnect (PCI) bus, local area network (LAN), wide area network (WAN), telecommunication network, wireless communication network, and the Internet.

In certain embodiments, a number of computer system 100 located at different locations may be connected through a communication network to form a collaborative distributed computer system (not shown in FIG. 1).

When computer problems occur in one or more computer systems, in order to resolve the computer problems, it is necessary to find the root causes of the computer problems. Conventionally, some solutions for finding root causes of computer problems include: (a) a solution that requires knowing or building certain model of infrastructure, relationship, and dependencies among various processes operating in the computer systems, (b) a fixed solution to a computer system that is specific to hardware, firmware, storage, and/or networking, and (c) a solution that is specific to performance monitoring.

The present disclosure discloses solutions based on contention and other problems found dynamically, not based on the prior knowledge of the computer system, the hardware, firmware, storage, and/or networking, or performance monitoring.

In any computer system, computer resources such as CPU time, and memory space, are limited and these resources must be shared. However, under certain circumstances, these resources may not be shared, and must be accessed exclusively by certain processes. For example, a variable stored in a memory location may be examined by multiple processes at the same time. However, when the variable needs to be changed or updated, the variable as well as the memory location should not be accessed by any other processes other than the one intended to change or update the variable. Other examples of resources may include a database table, a database row, a database column, an internal structure in memory, a physical resource, and a subroutine in the code. A locking mechanism should be applied such that the variable is locked, and other processes will be kept out until the change or update is completed. With that locking mechanism, the process making a change or update may cause other processes to wait. If the changing process is not working properly, it may keep other processes to wait too long, sometimes, indefinitely. When that happens, contention is created.

When contention happens, it is necessary to investigate the contention, determine why a certain process keeps other processes waiting and waiting for an excessively long time, and determine the root cause of the contention. Under certain circumstances, the process may be in an infinite loop, or certain process requested a lock and failed to release the lock when it finished its intended function. For example, process A is not doing any processing because it is waiting for a resource held by process B and process B is looping. Or, process B might be waiting for a resource held by another process (process C), and that process is holding the resource for which process B is waiting too long. Process C may be waiting for a resource held by process D, and process D is waiting for a resource held by process E, and so on and so forth, forming a serialized resource chain. The holder of a resource is defined as a resource blocker. When a resource blocker is found and that resource blocker is not waiting for another resource, the resource blocker is defined as a final resource blocker.

In certain embodiments, the contention may be caused by an infinite loop, by excessive central processing unit (CPU) usage, or one or more server health problems. Various system modules such as a root cause analysis module may be used for detecting contention in computer systems. System control blocks and performance monitoring modules may also be examined to find the cause of contention issues.

In certain embodiments, the solution disclosure herein may be able to detect the contention not only on a local computer system, but also a remote computer system connected through a communication network. Finding the root cause of contention is not limited to local computer systems. For example, process A may be waiting for a resource held by process B and process B may be operating in a different computer system. The local computer system or a local component of the local computer system is invoked to detect root causes of contention on the different computer system. The different computer system may report to the local computer system that process B is waiting for a resource held by process C, and process C is on another computer system. Such processing is iteratively performed until a final resource blocker is found.

Figure 2:
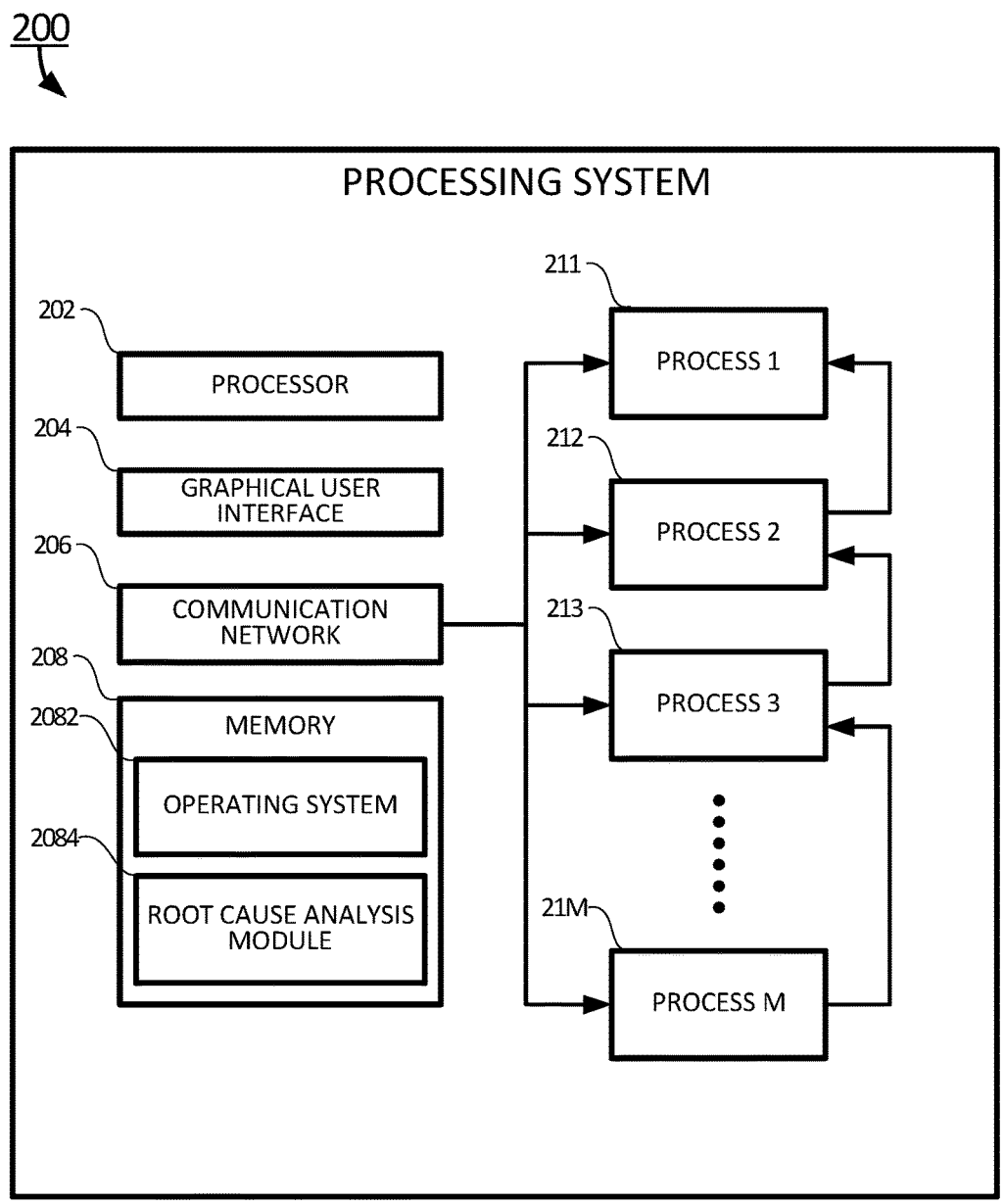
FIG. 2 is a block diagram of a computer system having computer problems locally according to certain embodiments of the disclosure.

In one aspect, the present disclosure relates to a processing system 200 for analyzing contention data and following resource blockers to find root causes of computer problems as shown in FIG. 2. In certain embodiments, the processing system 200 may a computer system as described in FIG. 1. The processing system 200 may include a processor 202, a graphical user interface 204, a communication network 206, and a memory 208. The graphical user interface 204 may be configured to display a process of finding root causes of the computer problems, one or more intermediate results, and the final results. The communication network 206 may be configured to communicate with one or more processes running on the processing system 200, and connect one or more computer systems. The memory 208 may store an operating system 2082 and a root cause analysis module 2084. The root cause analysis module 2084 may store certain computer executable instructions for analyzing contention data and following resource blockers to find root causes of computer problems in the processing system 200 or the one or more computer systems connected through the communication network 206.

In certain embodiments, the processing system 200 may initiate and run one or more processes in the processing system 200, such as PROCESS 1 (211), PROCESS 2 (212), PROCESS 3 (213), . . . , and PROCESS M (21M). Each of the one or more processes may be related to other processes, and may be dependent on each other. In one embodiment, for example, the PROCESS 1 (211) may be dependent on the PROCESS 2 (212), the PROCESS 1 (211) may be dependent on the PROCESS 2 (212), the PROCESS 2 (212) may be dependent on the PROCESS 3 (213), and the PROCESS M (21M) may be dependent on the PROCESS 3 (213), as shown by the arrows pointing to each of the processes in FIG. 2, forming a serializable resource chain. When PROCESS M (21M) is in an infinite loop, or there is a server health issue with the PROCESS M (21M), the PROCESS M (21M) may hold execution of the PROCESS 3 (213), the PROCESS 3 213 may hold execution of the PROCESS 2 (212), and the PROCESS 2 (212) may hold execution of the PROCESS 1 (211). Contention results in the computer system 200, and this contention may be the root cause of the computer problems in the computer system 200. One of the criteria for determining the contention is the time elapsed. When a process holds execution for more than a predetermined time period, such holding is defined as contention. In certain embodiments, the predetermined time period may be 1 minute. In other embodiments, the predetermined time period may be 5 minutes, depending on the nature of the one or more processes. This predetermined time could be configurable or may be set by the process detecting the contention. In another embodiment, the time may not be predetermined, but may be collected on the system to determine the normal length of time or may be determined by the process that is waiting. When the length waiting becomes abnormal or longer than the resource waiter allows, contention is indicated.

In certain embodiments, when executed at the processor 202 of the processing system 200, the computer executable instructions may cause the processor 202 to perform: detecting one or more resource waiters in a computer system, each of the resource waiters is associated with a corresponding one of one or more processes, iteratively determining whether one of the resource blockers is a resource waiter, until a final resource blocker not waiting for another resource is found, responsive to finding the final resource blocker: determining whether the final resource blocker is caused by a resource blocker in one of computer systems of a collaborative distributed computer system, and defining the final resource blocker as a final resource event when the final resource blocker is not caused by a resource blocker in one of computer systems of the collaborative distributed computer system, iteratively executing the method on the different computer system that caused the final resource blocker found in the computer system previously when the final resource blocker is caused by the resource blocker in one of computer systems of the collaborative distributed computer system, until a final resource blocker not waiting for another resource in the collaborative distributed computer system is found, determining, whether the final resource blocker has more than one symptoms, responsive to determining that the final resource blocker has one or more symptoms, each having a priority associated with the symptom, selecting a symptom that has the highest priority as a primary root cause of the computer problems and generating, using the processor, a report of root causes of the computer problems.

In certain embodiments, the root cause analysis module 2084 may classify a resource waiter as a process waiting for longer than a predetermined time period, and a resource blocker as a resource waiter waiting for another resource. The root cause analysis module 2084 may identify whether a first resource blocker is caused by a second resource blocker in the serializable resource chain. When the first resource blocker is not caused by the second resource blocker, then the root cause analysis module 2084 may define the first resource blocker as a final resource blocker. When the first resource blocker is caused by the second resource blocker, the root cause analysis module 2084 may iteratively execute the method to identify whether the second resource blocker is caused by an additional resource blocker, until the final resource blocker is found. The final resource blocker is the resource blocker that caused contention.

In certain embodiments, when the final resource blocker is found, the root cause analysis module 2084 may define the final resource blocker as the final resource event when the final resource blocker is not waiting for another resource.

In certain embodiments, the final resource event may include one or more symptoms, and each of the one or more symptoms may be assigned a corresponding priority. When the root causes of the computer problems are identified, the root cause analysis module 2084 may generate a report for one or more operators or system administrators. In certain embodiments, the report may include the root causes of the computer problems, the one or more symptoms according to their priorities, and the one or more resource blockers classified along the serializable resource chain. In one embodiment, the root cause analysis module 2084 may generate a report in text form for transmission to the one or more operators or system administrators. In another embodiment, the root cause analysis module 2084 may generate a display on the graphical user interface 204 for the one or more operators or system administrators. In yet another embodiment, the root cause analysis module 2084 may generate a report having one or more solutions to the computer problems according to an analysis of the root cause of the computer problem, the one or more symptoms, and the one or more resource blockers.

Figure 3:
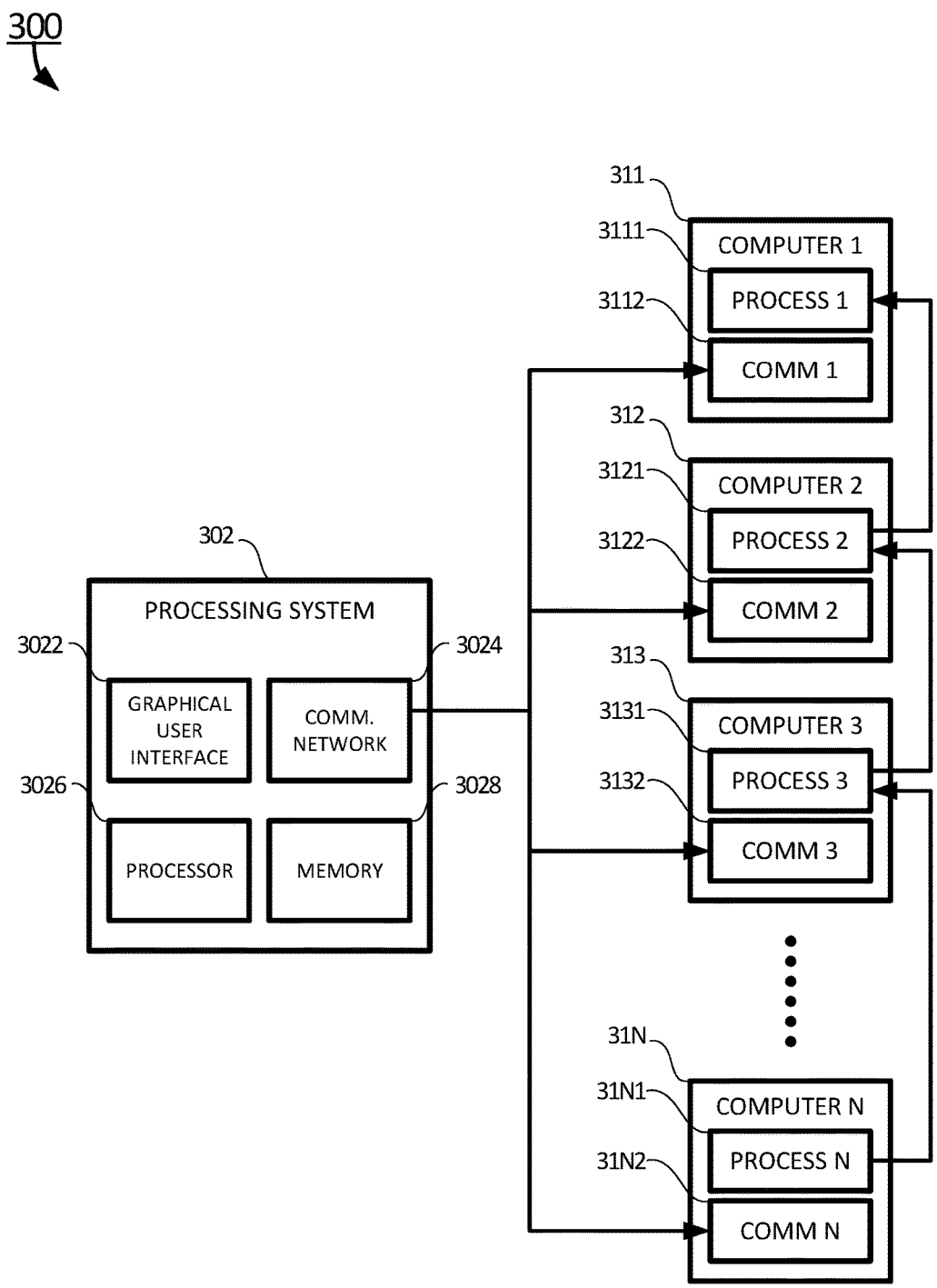
FIG. 3 is a block diagram of a collaborative distributed computer system having computer problems according to certain embodiments of the disclosure.

Referring now to FIG. 3, a block diagram of a collaborative distributed computer system 300 is shown according to certain embodiments of the disclosure. The collaborative distributed computer system 300 may include a processing system 302, and N computer systems: including computer 1 (311), computer 2 (312), computer 3 (313), . . . , and computer N (31N), where N is a positive integer. The processing system 302 may include a graphical user interface 3022, a communication network 3024, a processor 3026, and a memory 3028. The memory 3028 may store an operating system (not shown in FIG. 3) and a root cause analysis module (not shown in FIG. 3). The root cause analysis module may store certain computer executable instructions for analyzing contention data and following resource blockers to find root causes of computer problems in the collaborative distributed computer systems 300 connected through the communication network 3024.

In certain embodiments, each of the N computers has a communication interface and at least one process running. For example, the computer 1 (311) may have a COMM 1 (3112) and may run a PROCESS 1 (3111), the computer 2 (312) may have a COMM 2 (3122) and may run a PROCESS 2 (3121), . . . , and the computer N (31N) may have a COMM N (31N2) and may run a PROCESS N (31N1). These N computers: computer 1 (311), computer 2 (312), computer 3 (313), . . . , and computer N (31N) may be connected through the communication network 3024.

In certain embodiments, the graphical user interface 3022 may be configured to display a process of finding root causes of the computer problems, one or more intermediate results, and the final results. The memory 3028 may store an operating system and a root cause analysis module. The root cause analysis module may store certain computer executable instructions for analyzing contention data and following resource blockers to find root causes of computer problems in the processing system 302 or the one or more computer system connected through the communication network 206.

In certain embodiments, the processing system 302 may initiate and run one or more processes in the collaborative distributed computer system 300, such as PROCESS 1 (3111) on the computer 1 (311), PROCESS2 (3121) on the computer 2 (312), PROCESS 3 (3131) on the computer 3 (313), . . . , and PROCESS N (31 N 1) on the computer N (31 N). Each of the one or more processes may be related to other processes, and may be dependent on each other. In one embodiment, for example, the PROCESS 1 (3111) may be dependent on the PROCESS 2 (3121), the PROCESS 2 (3121) may be dependent on the PROCESS 3 (3131), the PROCESS 3 (3131) may be dependent on the PROCESS N (31N1), as shown by the arrows pointing to each of the processes in FIG. 3, forming a serializable resource chain. When PROCESS N (31N1) is in an infinite loop, or there is a server health issue with the PROCESS N (31N1), the PROCESS N (31N1) may hold execution of the PROCESS 3 (3131), the PROCESS 3 (3131) may hold execution of the PROCESS 2 (3121), and the PROCESS 2 (3121) may hold execution of the PROCESS 1 (3111). Contention results in the collaborative distributed computer system 300 and this contention may be the root cause of the computer problems in the collaborative distributed computer system 300.

In certain embodiments, when executed at the processor 3026 of the processing system 300, the computer executable instructions may cause the processor 3026 to perform: detecting one or more resource waiters in a computer system, each of the resource waiters is associated with a corresponding one of one or more processes, iteratively determining whether one of the resource blockers is a resource waiter, until a final resource blocker not waiting for another resource is found, responsive to finding the final resource blocker: determining whether the final resource blocker is caused by a resource blocker in one of the computer systems of a collaborative distributed computer system, and defining the final resource blocker as a final resource event when the final resource blocker is not caused by a resource blocker in one of the computer systems of the collaborative distributed computer system, iteratively executing the method on the different computer system that caused the final resource blocker found in the computer system previously when the final resource blocker is caused by the resource blocker in one of the computer systems of the collaborative distributed computer system, until a final resource blocker not waiting for another resource in the collaborative distributed computer system is found, determining, whether the final resource blocker has more than one symptoms, responsive to determining that the final resource blocker has one or more symptoms, each having a priority associated with the symptom, selecting a symptom that has the highest priority as a primary root cause of the computer problems and generating, using the processor, a report of root causes of the computer problems.

In certain embodiments, the root cause analysis module may classify a resource waiter as a process waiting for longer than a predetermined time period, and a resource blocker as a resource waiter waiting for another resource. The root cause analysis module may identify whether a first resource blocker is caused by a second resource blocker in the serializable resource chain. When the first resource blocker is not caused by the second resource blocker, then the root cause analysis module may define the first resource blocker as the final resource blocker. When the first resource blocker is caused by the second resource blocker, the root cause analysis module may iteratively execute the method to identify whether the second resource blocker is caused by an additional resource blocker, until the final resource blocker is found. The final resource blocker is the resource blocker that is not waiting for another resource.

In certain embodiments, when the final resource blocker is found, the root cause analysis module may define the final resource blocker's contention as the final resource event, which is the last resource blocker found that is not waiting for another resource blocker.

In certain embodiments, the final resource event may include one or more additional symptoms not related to contention identified for the final resource blocker, and each of the one or more symptoms may be assigned a corresponding priority. When the root causes of the computer problems are identified, the root cause analysis module may generate a report for one or more operators or system administrators. In certain embodiments, the report may include the root causes of the computer problems, the one or more symptoms according to their priorities, and the one or more resource blockers classified along the serializable resource chain. In one embodiment, the root cause analysis module may generate a report in text form for transmission to the one or more operators or system administrators. In another embodiment, the root cause analysis module may generate a display on the graphical user interface 204 for the one or more operators or system administrators. In yet another embodiment, the root cause analysis module may generate a report having one or more solutions to the computer problems according to an analysis of the root cause of the computer problem, the one or more symptoms, and the one or more resource blockers.

Figure 4:
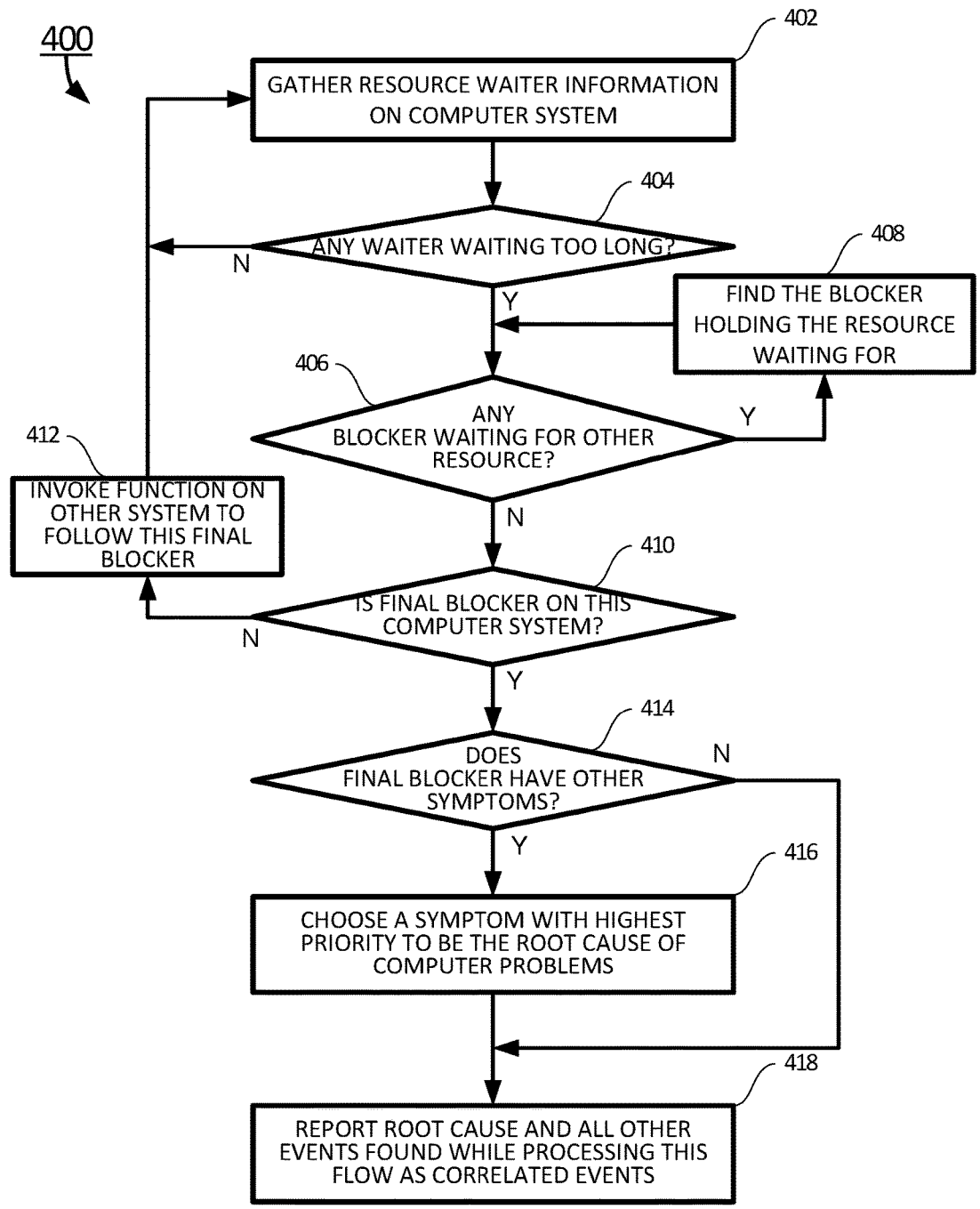
FIG. 4 is a flowchart of an exemplary method of analyzing contention data and following resource blockers to find root causes of computer problems according to certain embodiments of the present disclosure.

In another aspect, the present disclosure relates to a method of analyzing contention data and following resource blockers to find root causes of computer problems. A flowchart of an exemplary method 400 of analyzing contention data and following resource blockers to find root causes of computer problems is shown in FIG. 4 according to certain embodiments of the present disclosure.

At block 402, once a computer system or a collaborative distributed computer system (collectively called computer system) is started and running, one or more processes may be running on the computer system. The computer system may have a memory storing a root cause analysis module configured to find root causes of computer problems. In certain embodiments, the root cause analysis module may be used to gather resource waiter information.

At query block 404, in one embodiment, the root cause analysis module may be used to gather contention information by looking at each of the processes running and where certain processes may be in contention with other processes along a serialized resource chain to find one or more resource waiters waiting for resources held by other processes. The root cause analysis module may examine wait time of each of the resource waiters, and compare the wait time to a predetermined time period threshold. When the wait times of one or more resource waiters are less than the predetermined time period threshold, the root cause analysis module returns the execution of the method to the beginning block 402. When the wait times of the one or more resource waiters exceed the predetermined time period threshold, those resource waiters are defined as being in contention with the holders of those resources (also called resource blockers), and the root cause analysis module may proceed to block 406.

At query block 406, the root cause analysis module may iteratively look for a resource blocker waiting for any other resources among the one or more resource blockers. When a current resource blocker is waiting for another resource, the root cause analysis module may proceed to block 408. When a current resource blocker is not waiting for another resource, the root cause analysis module may proceed to block 410.

At block 408, the root cause analysis module may iteratively find the resource blockers of the resources waited for by the blockers previously found in query block 406, until a final resource blocker is found. The final resource blocker is the resource blocker that is not waiting for another resource.

At query block 410, the root cause analysis module may check whether the final resource blocker is located in the computer system locally. When the final resource blocker is located in the computer system locally, the root cause analysis module may proceed to block 414. When the final resource blocker is located in a different computer system of a collaborative distributed computer system, the root cause analysis module may proceed to block 412.

At block 412, the root cause analysis module may invoke a similar function installed on the different computer system to follow the current final resource blocker found and to start iteratively looking for next final resource blocker in the different computer system beginning at block 402 until the final resource blocker of the collaborative distributed computer system is finally found.

At query block 414, in certain embodiments, the final resource blocker may have one or more symptoms not related to contention, and each of the one or more symptoms may be assigned a corresponding priority. The root cause analysis module may examine the final resource blocker to see whether the final resource blocker has one or more symptoms. When the final resource blocker has only one symptom, the root cause analysis module may proceed to block 418. When the final resource blocker has only two or more symptoms, the root cause analysis module may proceed to block 416.

At block 416, the root cause analysis module may choose a symptom that has the highest priority to be the root cause of the computer problems.

At block 418, once the root causes of the computer problems are identified, the root cause analysis module may generate a report for one or more operators or system administrators. In certain embodiments, the report may include the root causes of the computer problems, the one or more symptoms according to their priorities, and the one or more resource blockers classified along the serializable resource chain.

In one embodiment, the root cause analysis module may generate a report in text form for transmission to the one or more operators or system administrators. In another embodiment, the root cause analysis module may generate a display on the graphical user interface for the one or more operators or system administrators. In yet another embodiment, the root cause analysis module may generate a report having one or more solutions to the computer problems according to an analysis of the root cause of the computer problem, the one or more symptoms, and the one or more resource blockers.

In yet another aspect, the present disclosure relates to a computer program product. In certain embodiments, the computer program product may include a non-transitory storage medium readable by a processor of a processing system and storing computer executable instructions for execution by the processor to perform a method of analyzing contention data and following resource blockers to find root causes of computer problems. The method may include: detecting one or more resource waiters in a computer system, each of the resource waiters is associated with a corresponding one of one or more processes, iteratively determining whether one of the resource blockers is a resource waiter, until a final resource blocker not waiting for another resource is found, responsive to finding the final resource blocker: determining whether the final resource blocker is caused by a resource blocker in one of computer systems of a collaborative distributed computer system, and defining the final contention event as the final event when the final resource blocker is not caused by a resource blocker in one of computer systems of the collaborative distributed computer system, iteratively executing the method on the different computer system that caused the final resource blocker found in the computer system previously when the final resource blocker is caused by the resource blocker in one of computer systems of the collaborative distributed computer system, until a final resource blocker not waiting for another resource in the collaborative distributed computer system is found, determining, whether the final resource blocker has more than one symptoms, responsive to determining that the final resource blocker has one or more symptoms, each having a priority associated with the symptom, selecting a symptom that has the highest priority as a primary root cause of the computer problems and generating, using the processor, a report of root causes of the computer problems.

Aspects of the present disclosure are described herein with reference to flowchart illustrations and/or block diagrams of methods, and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of analyzing contention data and following one or more resource blockers to find root causes of computer problems, comprising:
   detecting, using a processor of a processing system, one or more resource waiters in a first computer system of a collaborative distributed computer system, wherein each of the one or more resource waiters is associated with a corresponding one of one or more processes;
   iteratively determining whether one of the one or more resource waiters is blocked by a resource blocker, until a final resource blocker is found;
   responsive to finding the final resource blocker:
      determining whether the final resource blocker is in the first computer system or a second computer system of the collaborative distributed computer system;
      responsive to determining that the final resource blocker is in the first computer system of the collaborative distributed computer system, defining the final resource blocker as a final resource event; and
      responsive to determining that the final resource blocker is in the second computer system of the collaborative distributed computer system, iteratively executing the method on the second computer system until a final resource event is found, wherein the final resource event comprises a final resource blocker not waiting for another resource in the collaborative distributed computer system;
   wherein:
      the resource waiter comprises a process waiting longer than a predetermined time period, and wherein the resource blocker comprises a process holding a resource.

2. The method of claim 1, further comprising:
   determining, using the processor, whether the final resource event has more than one symptom; and
   responsive to determining that the final resource event has more than one symptom, each having a priority associated with the symptom, selecting a symptom that has the highest priority as a primary root cause of the computer problems; and
   generating, using the processor, a report of one or more root causes of the computer problems.

3. The method of claim 1, wherein the computer system comprises:
   the processing system having one or more processes running; and
   one or more computer systems of the collaborative distributed computer system connected through the communication network.

4. The method of claim 1, wherein the generating comprises generating a report having:
   one or more root causes of the computer problems;
   one or more symptoms according to their priorities; and
   one or more resource blockers detected along a serializable resource chain.

5. The method of claim 1, wherein the generating comprises:
   generating the report in text form for transmission to one or more operators;
   generating a display of the report on a graphical user interface for one or more operators; or
   generating the report having one or more solutions to the computer problems according to an analysis of the one or more root causes of the computer problems, one or more symptoms, and one or more resource blockers.

6. The method of claim 1, further comprising:
identifying a resource blocker as a resource waiter when the resource blocker is waiting for a resource.

7. A processing system for analyzing contention data and following resource blockers to find root causes of computer problems, comprising:
a processor;
a communication network configured to communicate with one or more processes running on the processing system, and connect one or more computer systems of a collaborative distributed computer system;
a graphical user interface configured to display a process of finding root causes of the computer problems, and one or more intermediate results; and
a memory storing an operating system and a root cause analysis module having computer executable instructions, when executed at the processor of the processing system, the computer executable instructions cause the processor to perform a method of analyzing contention data and following resource blockers to find root causes of computer problems, comprising:
detecting, using the processor of the processing system, one or more resource waiters in a first computer system of a collaborative distributed computer system, wherein each of the one or more resource waiters is associated with a corresponding one of one or more processes;
iteratively determining whether one of the one or more resource waiters is blocked by a resource blocker, until a final resource blocker is found;
responsive to finding the final resource blocker:
determining whether the final resource blocker is in the first computer system or a second computer system of the collaborative distributed computer system;
responsive to determining that the final resource blocker is in the first computer system of the collaborative distributed computer system, defining the final resource blocker as a final resource event; and
responsive to determining that the final resource blocker is in the second computer system of the collaborative distributed computer system, iteratively executing the method on the second computer system until a final resource event is found, wherein the final resource event comprises a final resource blocker not waiting for another resource in the collaborative distributed computer system;
wherein:
the resource waiter comprises a process waiting longer than a predetermined time period, and wherein the resource blocker comprises a process holding a resource.

8. The processing system of claim 7, wherein the method further comprises:
determining, using the processor, whether the final resource event has more than one symptom; and
responsive to determining that the final resource event has more than one symptom, each having a priority associated with the symptom, selecting a symptom that has the highest priority as a primary root cause of the computer problems; and
generating, using the processor, a report of one or more root causes of the computer problems.

9. The processing system of claim 7, wherein the computer system comprises:
the processing system having one or more processes running; and
one or more computer systems of the collaborative distributed computer system connected through the communication network.

10. The processing system of claim 7, wherein the generating comprises generating a report having:
one or more root causes of the computer problems;
one or more symptoms according to their priorities; and
one or more resource blockers detected along a serializable resource chain.

11. The processing system of claim 7, wherein the generating comprises:
generating the report in text form for transmission to one or more operators;
generating a display of the report on a graphical user interface for one or more operators; or
generating the report having one or more solutions to the computer problems according to an analysis of the one or more root causes of the computer problems, one or more symptoms, and one or more resource blockers.

12. The processing system of claim 7, further comprising:
identifying a resource blocker as a resource waiter when the resource blocker is waiting for a resource.

13. A computer program product comprising:
a non-transitory storage medium readable by a processor of a processing system and storing computer executable instructions for execution by the processor to perform a method of analyzing contention data and following resource blockers to find root causes of computer problems, the method comprising:
detecting, using the processor of the processing system, one or more resource waiters in a first computer system of a collaborative distributed computer system, wherein each of the one or more resource waiters is associated with a corresponding one of one or more processes;
iteratively determining whether one of the one or more resource waiters is blocked by a resource blocker, until a final resource blocker is found;
responsive to finding the final resource blocker:
determining whether the final resource blocker is in the first computer system or a second computer system of the collaborative distributed computer system;
responsive to determining that the final resource blocker is in the first computer system of the collaborative distributed computer system, defining the final resource blocker as a final resource event; and
responsive to determining that the final resource blocker is in the second computer system of the collaborative distributed computer system, iteratively executing the method on the second computer system until a final resource event is found, wherein the final resource event comprises a final resource blocker not waiting for another resource in the collaborative distributed computer system;
wherein:
the resource waiter comprises a process waiting longer than a predetermined time period, and wherein the resource blocker comprises a process holding a resource.

14. The computer program product of claim 13, wherein the method further comprises:

determining, using the processor, whether the final resource event has more than one symptom; and responsive to determining that the final resource event has more than one symptom, each having a priority associated with the symptom, selecting a symptom that has the highest priority as a primary root cause of the computer problems; and generating, using the processor, a report of one or more root causes of the computer problems.

15. The computer program product of claim 13, wherein the computer system comprises:

the processing system having one or more processes running; and one or more computer systems of the collaborative distributed computer system connected through the communication network.

16. The computer program product of claim 13, wherein the generating comprises generating a report having:

one or more root causes of the computer problems;

one or more symptoms according to their priorities; and one or more resource blockers detected along a serializable resource chain.

17. The computer program product of claim 13, further comprising:

identifying a resource blocker as a resource waiter when the resource blocker is waiting for a resource.

* * * * *